United States Patent [19]

Kato

[11] Patent Number: 5,239,335
[45] Date of Patent: Aug. 24, 1993

[54] AUTO FOCUS APPARATUS HAVING A PLURALITY OF LIGHT EMITTING ELEMENTS

[75] Inventor: Shigeru Kato, Machida, Japan

[73] Assignee: Olympus Optical Co., Ltd., Tokyo, Japan

[21] Appl. No.: 829,386

[22] Filed: Feb. 3, 1992

[30] Foreign Application Priority Data

Feb. 4, 1991 [JP] Japan .................... 3-035664

[51] Int. Cl.$^5$ .............. G03B 13/36; G01C 3/08; G02B 7/32; G01J 1/20
[52] U.S. Cl. ...................... 354/403; 356/1; 250/201.4
[58] Field of Search .............. 354/403; 356/1, 4; 250/201.4, 201.6

[56] References Cited

U.S. PATENT DOCUMENTS

| | | | |
|---|---|---|---|
| 4,740,806 | 4/1988 | Takehana | 354/403 |
| 4,803,508 | 2/1989 | Matsui et al. | 354/403 |
| 4,958,180 | 9/1990 | Matsui et al. | 354/403 |
| 5,125,735 | 6/1992 | Oizumi et al. | 354/403 X |

FOREIGN PATENT DOCUMENTS

| | | |
|---|---|---|
| 58-9013 | 1/1983 | Japan . |
| 58-93040 | 6/1983 | Japan . |
| 62-223734 | 10/1987 | Japan . |
| 1-250813 | 10/1989 | Japan . |

*Primary Examiner*—W. B. Perkey
*Attorney, Agent, or Firm*—Cushman, Darby & Cushman

[57] ABSTRACT

A multimode focus detecting apparatus comprises a light emitting device for irradiating an object to be detected, a light receiving device for receiving light reflected from the object, and a light receiving optical system for collecting the reflected light on the light receiving device, so that a position of the object is detected in accordance with a position of the reflected light incident on the light receiving device, in which the light emitting device includes a plurality of light emitting elements and a light emitting optical system disposed in front of the light emitting elements, having an exit surface from which light emitted from the light emitting elements emerges, with a positive refracting power as a whole. Thus, the multimode focus detecting apparatus has advantages that the difference in focus detecting ability between individual points in the visual field is reduced and focus detection can be made to a far distance in its circumference as well as at the center, so that in an active type AF camera having a telephoto lens system in particular, AF with a high degree of accuracy is possible to a far distance.

9 Claims, 8 Drawing Sheets

AUTO FOCUS APPARATUS HAVING A PLURALITY OF LIGHT EMITTING ELEMENTS

BACKGROUND OF THE INVENTION a) Field of the Invention

This invention relates to a multimode focus detecting apparatus and, more particularly, to an active type multimode focus detecting apparatus in which a plurality of rays of infrared light is projected toward an object to be photographed and the light reflected from the object is received to thereby detect automatically an object distance.

b) Description of the Prior Art

An automatic focusing system which has been employed in cameras in the past may roughly fall into two categories: one is of a passive type where focus detection is performed on the basis of information of brightness distribution of an object to be photographed and the other is of an active type where beams of, for example, infrared light and ultrasound, are projected toward the object and focus detection is performed on the basis of reflection signals of the beams. Of these types, an automatic focus (hereinafter abbreviated to AF) device based on the so-called infrared active type triangulation focus detecting system can be realized with a simple arrangement and is employed in many products, which AF device is such that infrared light is projected toward the object through a projecting lens, the light reflected from the object is received by a semiconductor position detecting device through a light receiving lens disposed at a certain distance from the projecting lens, namely, at a distance of a base length, and an object distance is measured according to the position of incidence of the light.

Recently, the use of the active type AF device has accelerated the advance of the zoom and long focal distance of the camera and, in order to bring accurately the object to a focus even at tele-position, there is a need of making focus detection possible with respect to a farther distance.

Increasing a focus-detectable distance may be attained by one way of heightening the intensity of infrared light projected from the projecting lens and by the other way of increasing the S/N ratios of the semiconductor position detecting device and the processing circuit of a light receiving system. Of these ways, a packaged IRED (infrared emitting diode) is known, as a measure for increasing the projection intensity, from the past, in which by potting an optical resin on the light emitting surface of a light emitting element such as the IRED, the light emitting surface has a lens function to converge light diverging from the light emitting element so that rays of light are effectively introduced into the projecting lens disposed on the object side.

In the case of the active type AF device having a focus detecting zone only in the central area of its image plane, it has developed the defect that if a main object to be photographed does not lie in the direction of propagation of projected light, another object or a background will be brought to a focus, that is, a subject will come to a focus at infinity, with the result that the main object is in an out-of-focus condition on photographing.

Hence, this prior art device has required the operation of the so-called focus lock that the object to be photographed is previously set in a focus frame, disposed in a finder according to the picture composition, for indicating the direction of projection of infrared light, to perform focus detection, following which framing is reset for photographing. The technique popularly termed the wide-field AF or multi-point focus detection has thus proposed that the projecting signal for focus detection is used as a plural to determine a plurality of focus detecting positions in the finder, and thereby attempts have been made to eliminate the complicated operation such as in the focus lock.

However, when the packaged IRED is intended to realize such a multi-point focus detecting system, it has encountered the problems that the projection intensity, caused by a light emitting element, at the center of the visual field is increased, but the projection from another light emitting element, outside the center, makes convergent beams of light asymmetric because the light emitting element is not located on the optical axis of the packaged IRED and consequently, the form of projection intensity distribution is deteriorated as plotted in FIG. 1, which situation produces a great difference in focus detecting performance between the areas at the center and outside it.

SUMMARY OF THE INVENTION

It is, therefore, an object of the present invention to provide a multimode focus detecting apparatus in which the difference in focus detecting ability between individual points in the visual field is reduced and focus detection can be made to a far distance in its circumference as well as at the center.

This object is accomplished, according to the present invention, by the arrangement that the multimode focus detecting apparatus comprises a light emitting means, a projecting optical system for projecting light emitted from the light emitting means toward an object to be detected, a light receiving means for receiving reflected light from the object, and a light receiving optical system for collecting the reflected light on the light receiving means, and is adapted to detect the positions of the object in accordance with the positions of the reflected light incident on the light receiving means, in which the light emitting means includes a plurality of light emitting elements and an optical member having an exit surface composed of a single curved surface, with a convergent function, and disposed just before the light emitting elements so that a converging power $\Sigma$ of the exit surface satisfies the following conditions:

$$\Sigma = \frac{r}{(1-n)d + nr} > 1.0 \qquad (1)$$

$$\frac{1}{r} g \Sigma^4 < 1.2 \qquad (2)$$

where r is the radius of curvature of the exit surface of the optical member, d the distance along the optical axis from each light emitting element to the vertex of the exit surface, n the refractive index of the optical member, and g the distance from the optical axis to each light emitting element.

According to another aspect of the present invention, the multimode focus detecting apparatus comprises a light emitting means, a projecting optical system for projecting light emitted from the light emitting means toward an object to be detected, a light receiving means for receiving reflected light from the object, and a light receiving optical system for collecting the reflected light on the light receiving means, and is adapted to detect the position of the object in accordance with the position of the reflected light incident on the light receiving means, in which the light emitting means includes a plurality of light emitting elements and an optical member having an exit surface composed of a plurality of curved surfaces, each with a convergent function, in pairs, one for each light emitting element, and disposed just before the light emitting elements so that a converging power $\Sigma$ of the exit surface satisfies Equation (1).

This and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Referring now to FIGS. 2 to 6, prior to the description of the embodiments, the specific structure and function of the light emitting means according to the present invention will be explained below.

Figure 1:
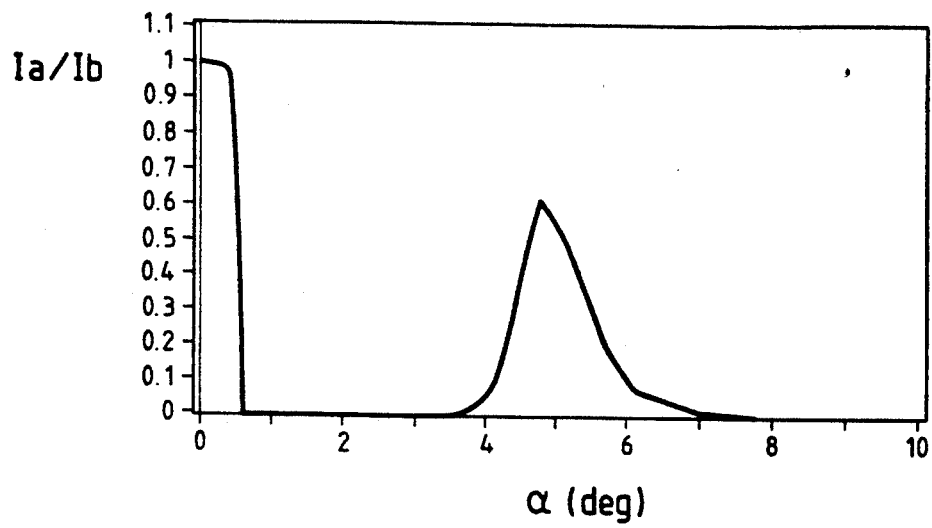
FIG. 1 is a graph showing projection intensity distribution of a conventional multi-point focus detecting system.
Figure 2:
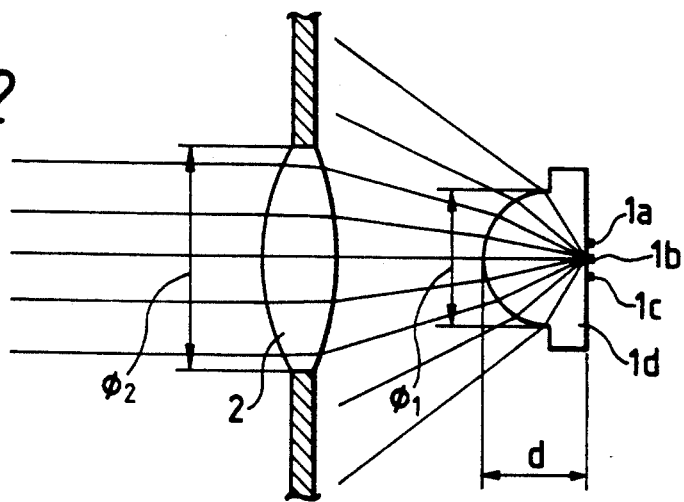
FIG. 2 is a view showing a state of rays of light diverging from a light emitting element at the center in a light emitting means of the multimode focus detection apparatus according to the present invention.
Figure 3:
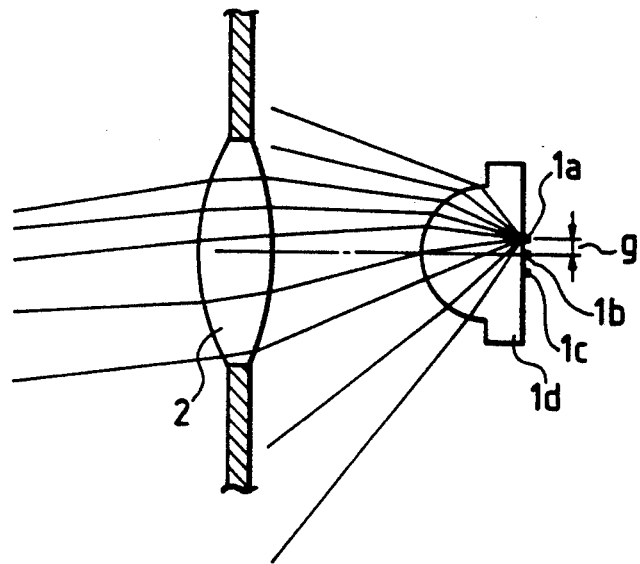
FIG. 3 is a view showing a state of rays of light diverging from another light emitting element positioned outside an optical axis in the light emitting means shown in FIG. 1.
Figure 4:
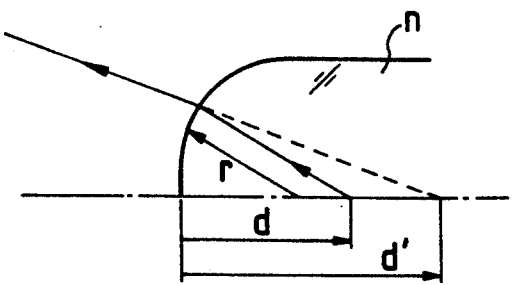
FIG. 4 is a view showing an imaging relationship in an optical member shown in FIG. 1.

FIGS. 2 to 4 show the arrangement of three light emitting elements 1a, 1b and 1c for three-point focus detection, in which FIG. 2 illustrates a state of rays of light diverging from the light emitting element 1b positioned at the center and FIG. 3 a state of rays of light diverging from the light emitting element 1a shifted by g from the optical axis. Here, reference numeral 1d represents an optical member having a convergent function (which will be hereinafter referred to as a package) and 2 a projecting lens.

From an imaging relationship shown in FIG. 4, the following equations holds for these cases:

$$\frac{1}{d'} = \frac{1-n}{r} + \frac{n}{d} \quad (3)$$

$$\beta = n\frac{d'}{d} \quad (4)$$

where r is the radius of curvature of the exit surface of the package 1d, d the distance from the vertex of the exit surface to the light emitting element 1b on the optical axis, d' the distance from the intersection of an extension line of emergent light with the optical axis to the vertex of the exit surface, n the refractive index of the package 1d in the wavelength of light emitted from each light emitting element, and $\beta$ the magnificaiton of the package 1d.

With respect to the magnification $\beta$, combination of Equations (3) and (4) yields $$\beta = \frac{nr}{(1-n)d + nr} \quad (5)$$

Here, if it is assumed that d=r, namely, the light emitting element 1b is disposed at the center of the curved surface of the exit surface of the package 1d, the convergent function will not be produced by the package 1d because the light rays diverging from the light emitting element 1b are perpendicularly incident on the exit surface of the package 1d. In this case, since $\beta$=n, a value $\Sigma$ indicative of a converging power is defined by $$\Sigma = \frac{\beta}{n} = \frac{r}{(1-n)d + nr} \quad (6)$$

According to Equation (6), when d=r, $\Sigma$=1, and in the case of d>r in which the convergent function is performed, $\Sigma$>1.

Since an aperture $\phi_2$ of the projecting lens 2 is finite, all the light rays diverging from the light emitting element are not necessarily projected by the projecting lens 2 and an eclipse is produced by a stop of the aperture $\phi_2$. If, therefore, the configuration and material of the package 1d are changed so that the condition $\Sigma$>1.0 is satisfied, more rays will be converged by the exit surface of the package 1d to be conducted to the projecting lens 2, with the resultant increase of the projection intensity. In the case where $\Sigma<1.0$, on the other hand, the divergent function is produced by the package $1d$ and hence the projection intensity is not heightened.

Figure 5:
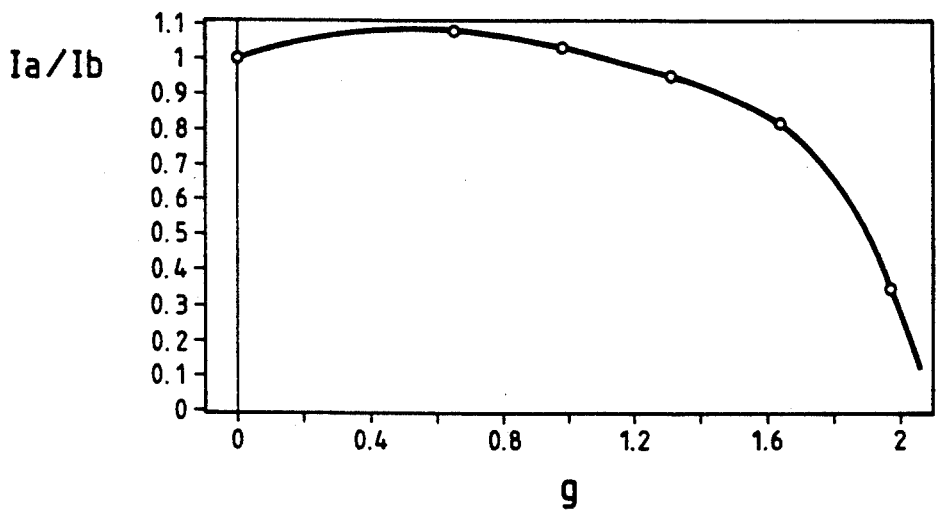
FIG. 5 is a graph showing a relationship between a ratio of the intensity of projection from the light emitting element outside the center to that from the light emitting element at the center and a distance from the optical axis to the light emitting element outside the center.

Further, the ratio of the projection intensity of the light from the light emitting element $1a$ positioned outside the center to that of the light from the light emitting element $1b$ at the center (which will be hereinafter defined as Ia/Ib) is almost proportional to $\Sigma^4$ and $1/r$ and has the relation as plotted in FIG. 5 with respect to g (the distance from the optical axis to the light emitting element $1a$), so that in order to hold Ia/Ib to approximately 1, it is desirable that Equation (2) is satisfied. If $(1/r)g\Sigma^4>1.2$, the value of Ia/Ib will be smaller and an excessively large difference in projection intensity between the rays from the light emitting elements at the center and those from the light emitting element outside the center makes larger the difference in accuracy of focus detection between them.

Figure 6:
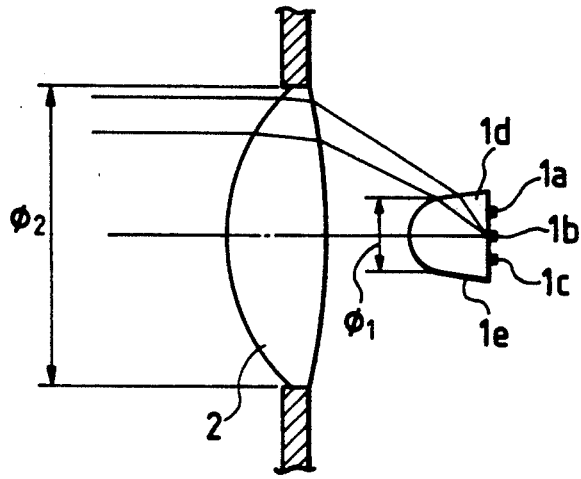
FIG. 6 is a view showing a modification example of the light emitting means shown in FIG. 1.

Moreover, if the aperture $\phi_2$ of the projecting lens 2 is relatively large, the eclipse will be produced by an aperture $\phi_1$ of the exit surface of the package $1d$. In such an instance, as shown in FIG. 6, a plane surface or an inclined surface $1e$ is provided in succession to the curved surface of the exit surface, thereby enabling more rays to be conducted to the projecting lens 2.

Figure 7:
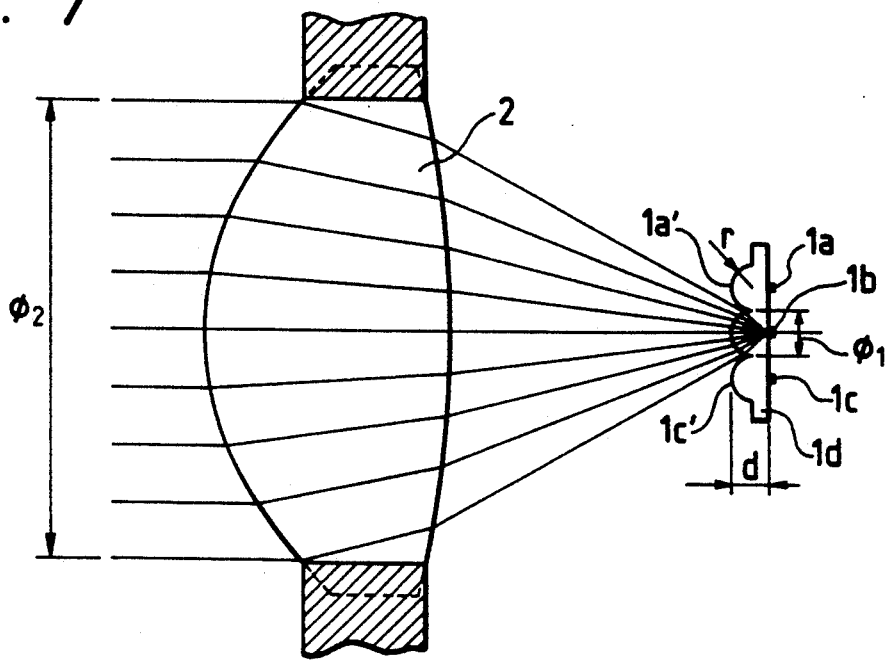
FIG. 7 is a view showing a state of rays of light diverging from the light emitting element at the center in another example of the light emitting means of the multimode focus detecting apparatus according to the present invention.
Figure 8:
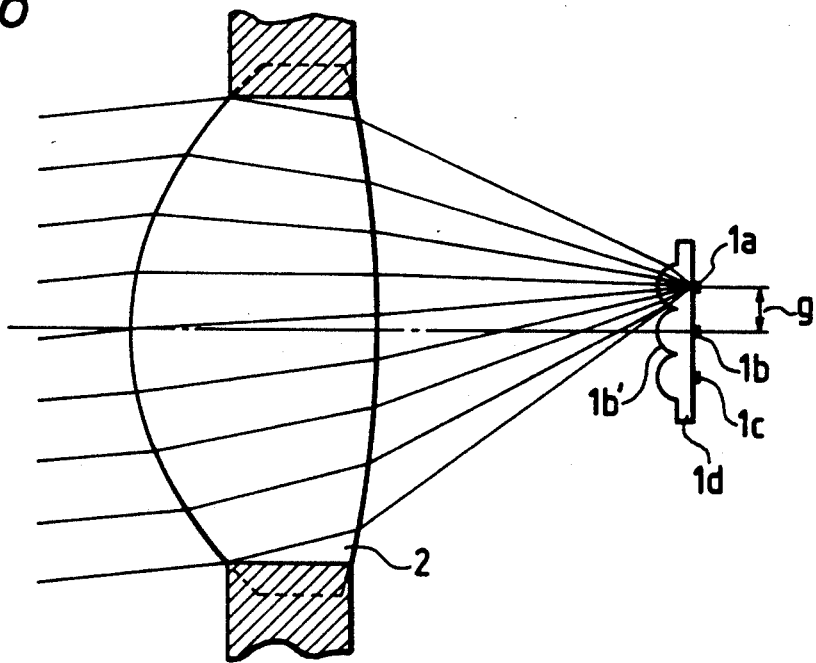
FIG. 8 is a view showing a state of rays of light diverging from the light emitting element outside the optical axis in the light emitting means of FIG. 7.

FIGS. 7 and 8 depict the arrangement of three light emitting elements $1a$, $1b$ and $1c$ for three-point focus detection, in which FIG. 7 shows a state of rays of light diverging from the light emitting element $1b$ positioned at the enter and FIG. 8 another state of rays of light diverging from the light emitting element $1a$ shifted by g from the optical axis. In these cases, the optical member $1d$ is provided with three curved surfaces $1a'$, $1b'$ and $1c'$ corresponding to the light emitting elements $1a$, $1b$ and $1c$, respectively, and having convergent functions.

When the radius of curvature of the exit surface $1a'$, $1b'$ or $1c'$ of the package $1d$ is represented by r, the distance from the vertex of each exit surface to the corresponding light emitting element $1a$, $1b$ or $1c$ by d, and the refractive index of the package $1d$ in the wavelength of light emitted from each light emitting element by n, Equations (3), (4) and (5) hold also for these cases, similar to FIGS. 2 and 3, from the imaging relationship shown in FIG. 4.

Here, if it is assumed that $d=r$, that is, each light emitting element is disposed at the center of curvature of the corresponding exit surface of the package $1d$, the convergent function will not be produced by the package age $1d$ because the rays diverging from the light emitting element are incident normally on the exit surface of the package $1d$. Hence, Equation (6) holds for this case, as in a single exit surface mentioned above, so that when $d=r$, $\Sigma=1$, and in the case of $d>r$ in which the convergent function is performed, $\Sigma>1$. Further, similar to the case of the single exit surface, if the configuration and material of the package $1d$ are changed so that the condition $\Sigma>1.0$ is satisfied, more rays will be converged by each exit surface of the package $1d$ to be conducted to the projecting lens 2, with the result that the projection intensity is increased. Where $\Sigma<1.0$, on the other hand, the divergent function is produced by the package $1d$ and hence the projection intensity is not heightened.

In order to prevent the exit surfaces $1a'$, $1b'$ and $1c'$ from interfering with one another, it is desirable that the condition $g \geq \phi_1$ is satisfied. Here, $\phi_1$ is the maximum value of an optical effective aperture of each of the exit surfaces $1a'$, $1b'$ and $1c'$ determined by the combination with the projecting lens 2.

Additionally, it is desirable that the configurations of the exit surfaces $1a'$, $1b'$ and $1c'$, namely, the values of the radius of curvature r of each of them and the distance d are equal to each other so that the light emitting elements at the center and in the circumference coincide in projection intensity distribution. Thus, the light emitting elements are identical in $\Sigma$ and the same projection intensity distribution is derived from the light emitting elements at three points.

If the optical performance of the projecting lens 2 is not corrected completely for aberration such as curvature of field and the difference of the projection intensity distribution arises between the center and the circumference, the difference can be reduced by optimizing the shapes of the curved surfaces equally spaced from the optical axis of the projecting lens 2 (that is, the center axis of the light emitting member) and the shape of the curved surface located on the optical axis.

Thus, according to the present invention, even if the package IRED is used as the light emitting device, the multimode focus detecting apparatus can be obtained in which the difference in focus detecting ability between individual points of the visual field is smaller.

Now, in accordance with the embodiments shown in the drawings, the present invention will be explained in detail below.

First Embodiment

At the beginning, reference is made to an active type triangulation focus detecting system for one-point focus detection which gives the fundamental of multimode focus detection.

Figure 9:
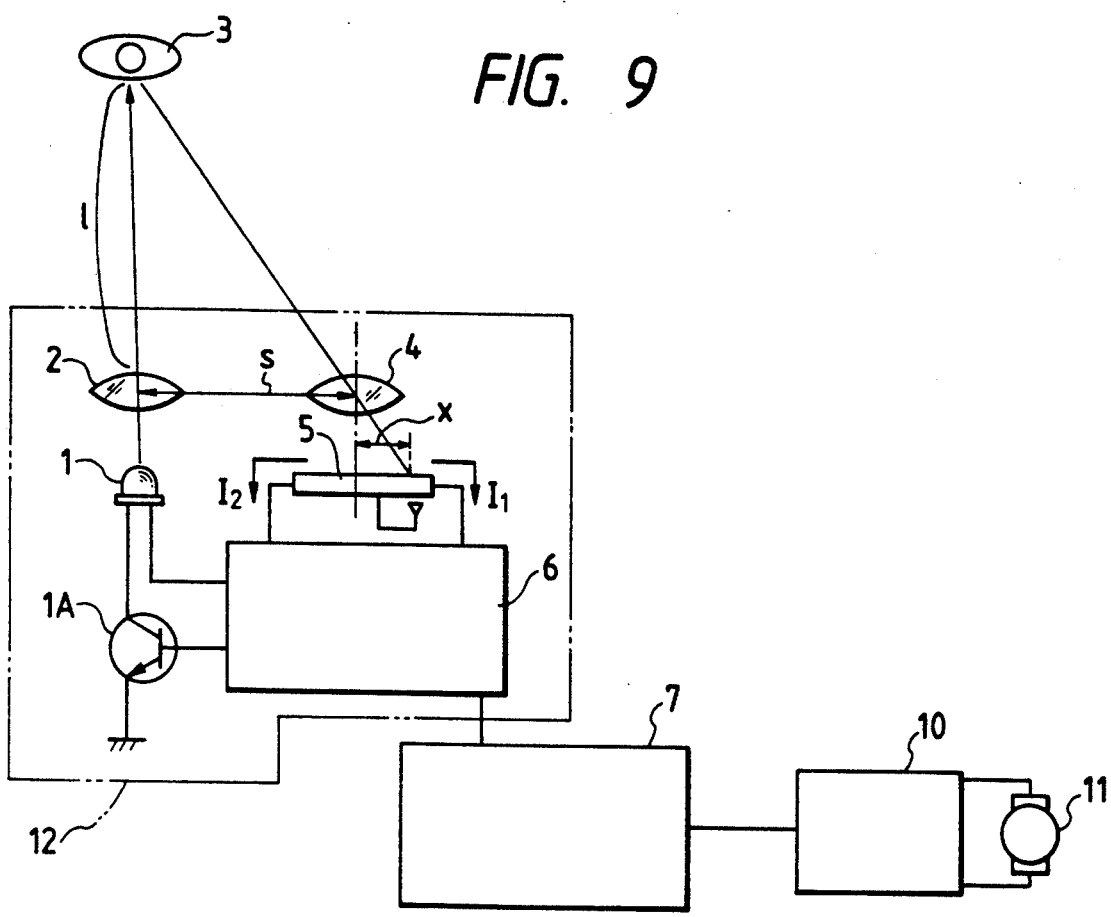
FIG. 9 is a view showing an arrangement of an essential portion of an automatic focusing camera including an active type triangulation focus detecting system for one-point focus detection.

FIG. 9 is a block diagram showing the arrangement of an essential portion of an automatic focusing camera including the preceding focus detecting system. Reference numeral 1 denotes an IRED. The arrangement is such that light emitted from the IRED 1, after being collected by the projecting lens 2, is radiated toward an object to be photographed 3 and the light reflected from the object 3 is imaged, through a light receiving lens 4, on a known position sensing device (hereinafter abbreviated to PSD) 5 comprising a semiconductor. The PSD 5 is constructed so that photocurrents $I_1$ and $I_2$ flow separately according to its imaging position and are supplied to an IC for AF 6. The IC 6 is designed to pulse-drive the IRED 1 through a transistor for IRED control 1A and to feed focus detection and reflected light intensity data based on the photocurrents $I_1$ and $I_2$ coming from the PSD 5 to a control means 7 in which a CPU is incorporated. The IRED 1, the transistor for IRED control 1A, the projecting lens 2, the light receiving lens 4, the PSD 5, and the IC for AF 6 constitute a focus detecting means 12.

The control means 7 is adapted to, for example, perform calculation for driving a lens for focus adjustment. The output of the control means 7 drives a motor 11, through a driver 10, which provides a power source for shifting the lens.

Here, a description is given of the operating principle of the infrared active type triangulation focus detecting system for measuring the object distance in virtue of the PSD 5. When the optical axis of the light receiving lens 4 is made to coincide with the center line of the PSD 5, an object distance $\iota$ is given by $$\iota = sf/x \tag{7}$$

where x is the distance from the center line to the position of incidence of reflected light, s the distance between the principal points of the projecting lens 2 and the light receiving lens 4, namely, the base length, and f the focal length of the light receiving lens 4.

Although both the photocurrents $I_1$ and $I_2$ generated at the PSD 5 are proportional to the intensity of incident light, the photocurrent ratio $I_1/I_2$ does not depend on the intensity and is determined only by the incident-light position x. When the overall length of the PSD 5 is taken as t, the following equation is obtained:

$$\frac{I_1}{I_2} = \frac{(t/2) + x}{(t/2) - x} \tag{8}$$

Since substitution of Equation (7) in Equation (8) gives $$\frac{I_1}{I_2} = \frac{t + (2sf/\iota)}{t - (2sf/\iota)} \tag{9}$$

it follows that if the photocurrent ratio $I_1/I_2$ of the PSD 5 is obtained, the object distance $\iota$ will be uniquely determined.

Figure 10:
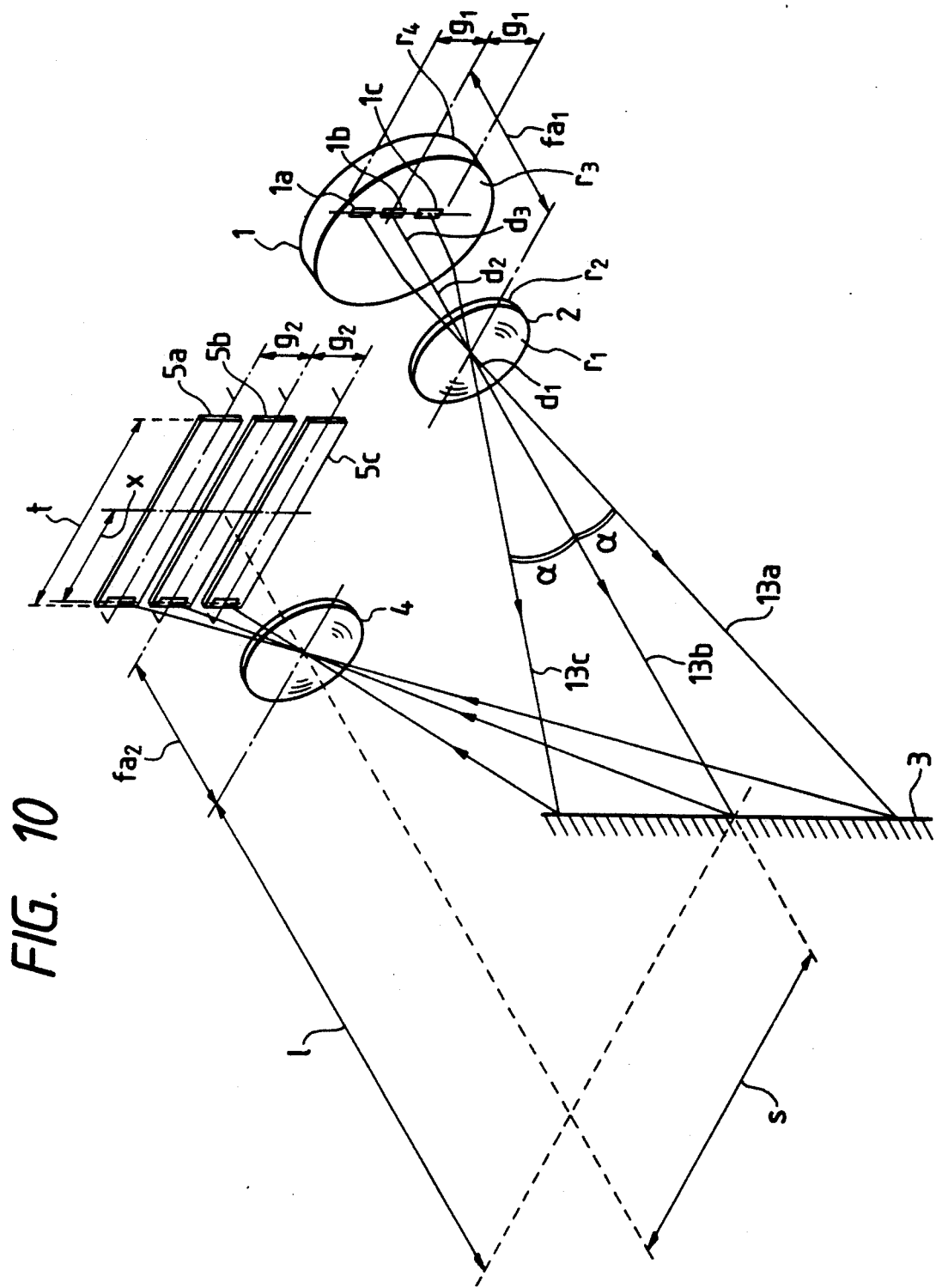
FIG. 10 is a perspective view showing an optical system of a first embodiment according to the present invention.

To simplify the explanation of the focus detecting principle of the active type triangulation focus detecting system, FIG. 9 shows a simple arrangement for one-point focus detection. FIG. 10 shows the arrangement of the optical system of the focus detecting means 12 in which the arrangement shown in FIG. 9 is applied to three-point focus detection.

Figure 11:
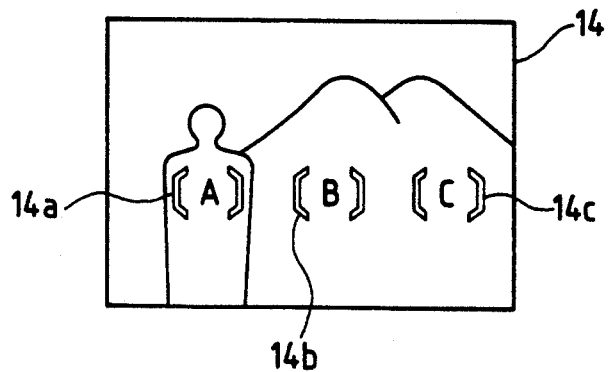
FIG. 11 is a view showing a focus frame of a visual field in a finder.

In FIG. 10, three PSDs 5a, 5b and 5c are used corresponding to three IREDs 1a, 1b and 1c, respectively. Divergent infrared rays for focus detection 13a, 13b and 13c from the three IREDs 1a, 1b and 1c are converged by the package 1 and change into beams close to parallel light beams through the projecting lens 2 toward the object 3. Each beam reflected from the object 3 is incident, through the light receiving lens 4, on the corresponding PSD of the three PSDs 5a, 5b and 5c. Although, in FIG. 10, the projecting lens 2 and the light receiving lens 4 are laterally disposed to facilitate the comprehension of the entire arrangement, it is actually required that the lateral arrangement shown in FIG. 10 is changed to a longitudinal one, that is, the projecting lens 2 and the light receiving lens 4 are longitudinally disposed so that infrared beams from the three IREDs 1a, 1b and 1c correspond to focus frames 14a, 14b and 14c, respectively, within a field frame 14 of the finder shown in FIG. 11.

As an example of a specific arrangement of the optical system of the focus detecting means 12, an angle $\alpha$ made by the divergent infrared ray 13b from the central IRED 1b with each of the divergent infrared rays 13a and 13c from the bilateral IREDs 1a and 1c is set at approximately 6° and the optical system is designed to satisfy the condition:

$$\tan \alpha = \frac{\beta g_1}{f_{a1}} \tag{10}$$

where $g_1$ is each space between the IREDs 1a, 1b and 1c, $f_{a1}$ the focal length of the projecting lens 2, and $\beta$ the magnification of the package 1.

Further, when each space between the PSDs 5a, 5b and 5c is denoted by $g_2$ and the focal length of the light receiving lens 4 by $f_{a2}$, the arrangement is set so that when $f_{a1} = f_{a2}$, $\beta g_1 = g_2$.

The reason why the PSD is separated into three pieces is that the influence of incident light from other directions in the one-point focus detection is minimized to intend the improvement of the S/N ratio.

The following is the numerical data examples of the light emitting optical system of the first embodiment.

NUMERICAL DATA EXAMPLE 1

| $f_{a1}$ = 10 mm, $\alpha$ = 6° (three-point focus detection) | | |
|---|---|---|
| r1 = 5.6 (aspherical) | | |
| | d1 = 5.1 | n1 = 1.48421 |
| r2 = −25.17 | | |
| | d2 = 3.72 | |
| r3 = 3.00 | | |
| | d3 = 3.2 | n2 = 1.48421 |
| r4 = ∞ (IRED) | | |

ASPHERICAL COEFFICIENTS

First surface

| P = 0.1419, | E = 0.55588 × 10⁻⁴ |
|---|---|
| F = 0.15566 × 10⁻⁵, | G = −0.97806 × 10⁻⁷ |
| Σ = 1.03 | |
| (1/r)gΣ⁴ = 0.26, g = 0.685 | |

Figure 12:
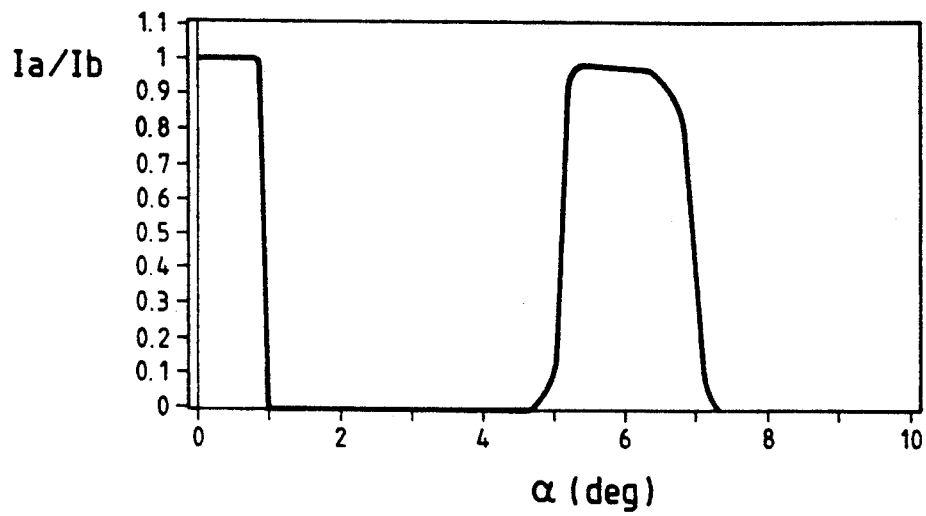
FIG. 12 is a graph showing the projection intensity distribution of numerical data example 1 of the first embodiment.

The result of projection intensity distribution of this numerical data example is plotted in FIG. 12. According to FIG. 12, it is seen that the difference between the projection intensities at the center and outside the center is diminished and the difference between the focus detecting abilities is reduced.

NUMERICAL DATA EXAMPLE 2

| $f_{a1}$ = 18.7 mm, $\alpha$ = 30.5° (five-point focus detection) | | |
|---|---|---|
| r1 = 10.37 (aspherical) | | |
| | d1 = 7.6 | n1 = 1.48421 |
| r2 = −54.36 | | |
| | d2 = 10.21 | |
| r3 = 2.25 | | |
| | d3 = 3.2 | n2 = 1.48421 |
| r4 = Σ (IRED) | | |

ASPHERICAL COEFFICIENTS

First surface

| P = 0.0928, | E = 0.19215 × 10⁻⁴ |
|---|---|
| F = 0.1157 × 10⁻⁷, | G = −0.89048 × 10⁻⁹ |
| Σ = 1.26 | |
| (1/r)gΣ⁴ = 0.97, g = 0.877 (when $\alpha$ = 5°) | |

Figure 13:
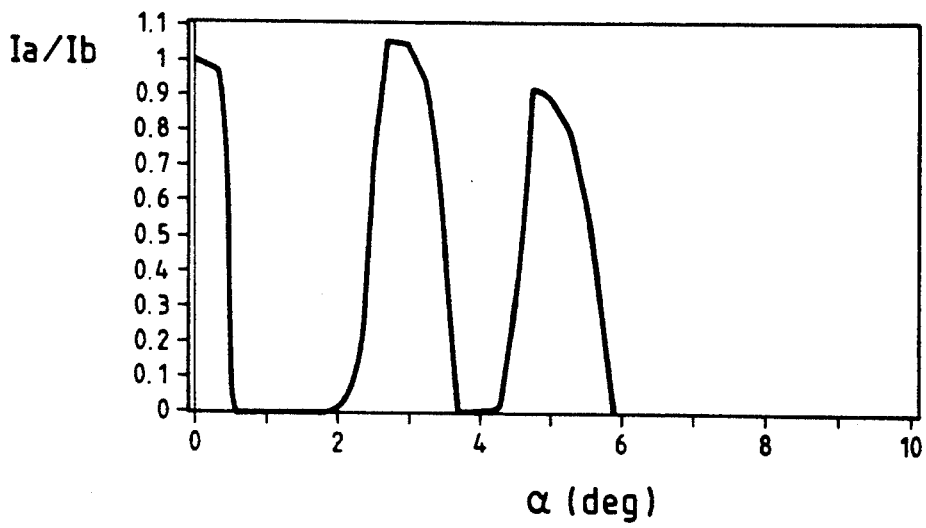
FIG. 13 is a graph showing the projection intensity distribution of numerical data example 2 of the first embodiment.

The result of projection intensity distribution of this numerical data example is plotted in FIG. 13. According to FIG. 13, it is seen that the difference between the projection intensities at the center and outside the center is diminished and the difference between the focus detecting abilities is reduced.

Figure 14:
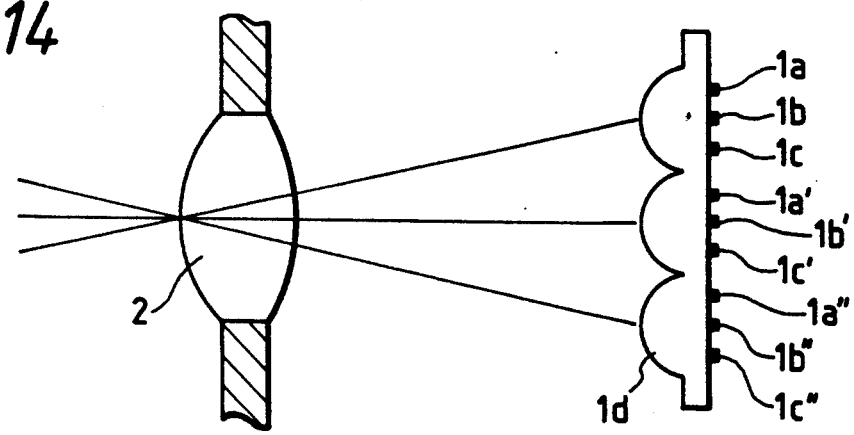
FIG. 14 is a view showing a modification example of a package of the first embodiment.

In the first embodiment, the exit surface of the package 1d may well be provided as a plural as shown in FIG. 14.

Second Embodiment

Figure 15:
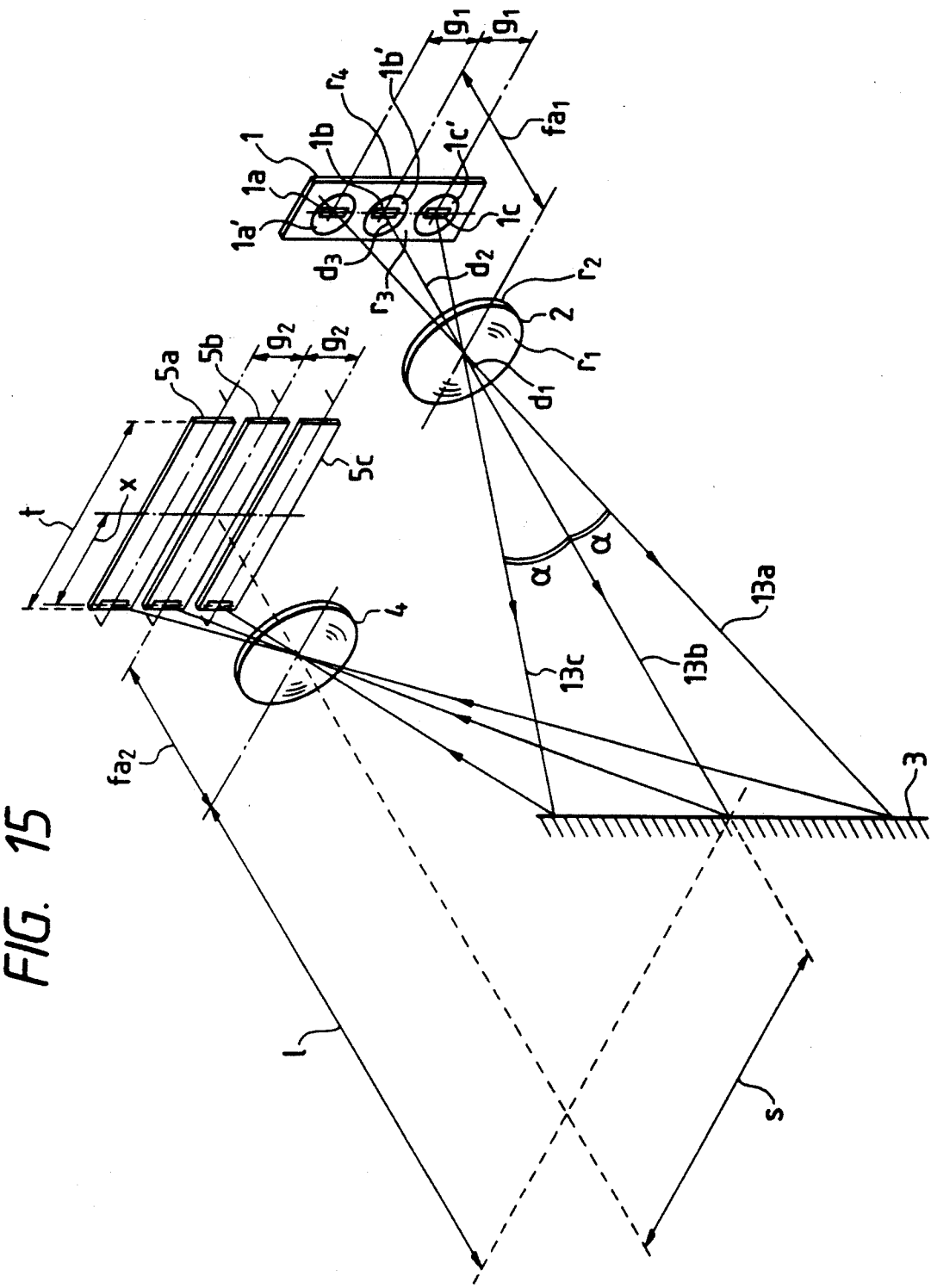
FIG. 15 is a perspective view showing an optical system of a second embodiment.

FIG. 15 illustrates the arrangement of the optical system of the focus detecting means in this embodiment.

In FIG. 15, three PSDs 5a, 5b and 5c are used corresponding to three IREDs 1a, 1b and 1c, respectively. Divergent infrared rays for focus detection 13a, 13b and 13c from the three IREDs 1a, 1b and 1c are converged by the exit surfaces 1a', 1b' and 1c' of the package 1 and change into beams close to parallel light beams through the projecting lens 2 toward the object 3. Each beam reflected from the object 3 is incident, through the light receiving lens 4, on the corresponding PSD of the three PSDs 5a, 5b and 5c. Although, in FIG. 15, the projecting lens 2 and the light receiving lens 4 are laterally disposed to facilitate the comprehension of the entire arrangement, it is actually required that the lateral arrangement shown in FIG. 15 is changed to a longitudinal one, that is, the projecting lens 2 and the light receiving lens 4 are longitudinally disposed so that infrared beams from the three IREDs 1a, 1b and 1c correspond to focus frames 14a, 14b and 14c, respectively, within a field frame 14 of the finder shown in FIG. 11.

As an example of a specific arrangement of the optical system of the focus detecting means 12, an angle $\alpha$ made by the divergent infrared ray 13b from the central IRED 1b with each of the divergent infrared rays 13a and 13c from the bilateral IREDs 1a and 1c is set at approximately 6° and the optical system is designed to satisfy the condition:

$$\tan \alpha = \frac{g1}{f_{a1}} \quad (11)$$

Further, the arrangement is set so that when $f_{a1} = f_{a2}$, $g_1 = g_2$.

The reason why the PSD is separated into three pieces is that the influence of incident light from other directions in the one-point focus detection is minimized to intend the improvement of the S/N ratio.

The following is the numerical data example of the light emitting optical system of the second embodiment.

NUMERICAL DATA EXAMPLE fa1 = 16 mm, $\alpha$ = 6° (three-point focus detection)
r1 = 9.18 (aspherical)
    d1 = 8.4    n1 = 1.48421
r2 = −34.88
    d2 = 9.54
r3 = 0.75
    d3 = 1.2    n2 = 1.48421
r4 = Σ (IRED)

Aspherical Coefficients

First surface

P = 0.1,         E = 0.22381 × 10⁻⁴
F = −0.12242 × 10⁻⁶,   G = −0.22293 × 10⁻⁸
Σ = 1.41
(1/r)gΣ⁴ = 0.26, g = 1.7 (when αø1 = 1.5)

Figure 16:
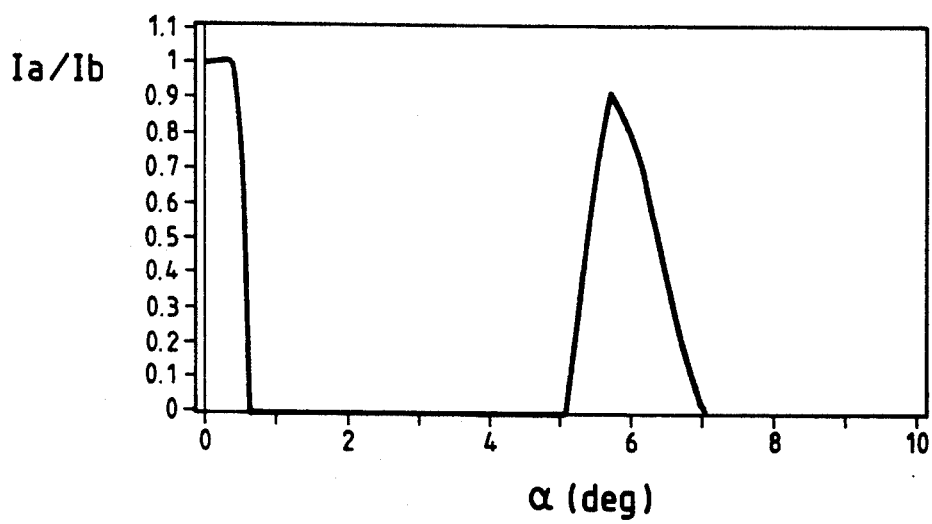
FIG. 16 is a graph showing the projection intensity distribution of a numerical data example of the second embodiment.

The result of projection intensity distribution of this numerical data example is plotted in FIG. 16. According to this figure, it is seen that the difference between the projection intensities at the center and outside the center is diminished and the difference between the focus detecting abilities is reduced.

In each numerical data example of the embodiments mentioned above, referene symbols $r_1, r_2, \ldots$ represent radii of curvature of the surfaces of individual lenses disposed in order from the object side, $d_1, d_2, \ldots$ thicknesses of individual lenses and spaces therebetween, and $n_1, n_2, \ldots$ refractive indices of individual lenses (refer to FIGS. 10 and 15).

The configuration of the aspherical surface in each embodiment is expressed by the following equation using the aspherical coefficients:

$$X = \frac{CY^2}{1 + (1 - PC^2Y^2)^{\frac{1}{2}}} + EY^4 + FY^6 + GY^8$$

where X represents coordinates in a direction of the optical axis, Y coordinates in a direction normal to the optical axis, and C the curvature (=1/r) at the vertex of the aspherical surface.

Although, in each embodiment of the present invention, the exit surface of the package of the light emitting optical system is configured as a spherical surface, it is not necessarily limited to the spherical surface and may well assume an aspherical shape.

Figure 17A:
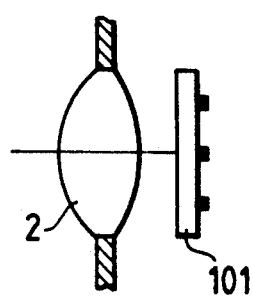
FIGS. 17A and 17B are views showing modification examples of the package of the second embodiment.
Figure 17B:
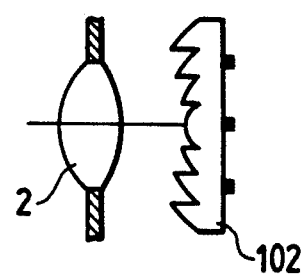

Further, as shown in FIGS. 17A and 17B, a gradient index lens 101 (or a holographic lens) and a Fresnel lens 102 may also be employed as the packages. In these cases, since the exit surface has a relatively plain shape compared with the curved surface or a plain shape, the projecting lens 2 can be disposed closer thereto. This enables the arrangement to be compact.

What is claimed is:

1. A multimode focus detecting apparatus, comprising:

light emitting means for irradiating an object to be detected;

light receiving means for receiving light reflected from said object; and a light receiving optical system for collecting said reflected light on said light receiving means, so that a position of said object is detected in accordance with a position of said reflected light incident on said light receiving means, wherein said light emitting means includes a plurality of light emitting elements and a light emitting optical system disposed in front of said plurality of light emitting elements, having an exit surface from which light emitted from said plurality of light emitting elements emerges, with a positive refracting power as a whole, and wherein a refracting power Σ of the exit surface of said light emitting optical system satisfies the following conditions:

$\Sigma = r/((1-n)d + nr) > 1.0$ $1/r \, g\Sigma^4 < 1.2$ wherein r is the radius of curvature of the exit surface of the light emitting optical system, d the distance along an optical axis from each light emitting element to the vertex of the exit surface, n the refractive index of the light emitting optical system, and g the distance from the optical axis to each light emitting element.

2. The apparatus according to claim 1, wherein the exit surface of said light emitting optical system is constructed from a single curved surface.

3. The apparatus according to claim 1, wherein the exit surface of said light emitting optical system is constructed from a plurality of curved surfaces.

4. A multimode focus detecting apparatus, comprising:

light emitting means;

a projecting optical system for projecting light emitted from said light emitting means toward an object to be detected;

light receiving means for receiving the light reflected from said object; and a light receiving optical system for collecting said reflected light on said light receiving means, so that a position of said object is detected in accordance with a position of said reflected light incident on said light receiving means, wherein said light emitting means includes a plurality of light emitting elements and a light emitting optical system disposed in front of said plurality of light emitting elements, having an exit surface from which light emitted from said plurality of light emitting elements emerges, with a positive refracting power as a whole, and wherein a refracting power $\Sigma$ of the exit surface of said light emitting optical system satisfies the following conditions:

$\Sigma = r/((1-n)d + nr) > 1.0$ $1/r\, g\Sigma^4 < 1.2$ wherein r is the radius of curvature of the exit surface of the light emitting optical system, d the distance along an optical axis from each light emitting element to the vertex of the exit surface, n the refractive index of the light emitting optical system, and g the distance from the optical axis to each light emitting element.

5. The apparatus according to claim 4, wherein the exit surface of said light emitting optical system is constructed from a single curved surface.

6. The apparatus according to claim 4, wherein the exit surface of said light emitting optical system is constructed from a plurality of curved surfaces.

7. The apparatus according to any one of claims 2, 3, 5, 6, wherein said light emitting elements are cemented to a surface opposite to the exit surface of said light emitting optical system.

8. A multimode focus detecting apparatus, comprising:

light emitting means for irradiating an object to be detected;

light receiving means for receiving light reflected from said object; and a light receiving optical system for collecting said reflected light on said light receiving means, so that a position of said object is detected in accordance with a position of said reflected light incident on said light receiving means, wherein said light emitting means includes a plurality of light emitting elements and a light emitting optical system disposed in front of said plurality of light emitting elements, having an exit surface from which light emitted from said plurality of light emitting elements emerges, with a positive refracting power as a whole, wherein the exit surface of said light emitting optical system is constructed from a plurality of curved surfaces, with said curved surfaces being combined in pairs with said light emitting elements, and wherein a refracting power $\Sigma$ of the exit surface of the light emitting optical system satisfies the following conditions:

$\Sigma = r/((1-n)d + nr) > 1.0$ $g \geq \phi_1$ wherein r is the radius of curvature of the exit surface of the light emitting optical system, d the distance along an optical axis from each light emitting element to the vertex of the exit surface, n the refractive index of the light emitting optical system, g the distance from the optical axis to each light emitting element, and $\phi_1$ is the maximum value of an optical effective aperture of the exit surface.

9. A multimode focus detecting apparatus, comprising:

light emitting means;

a projecting optical system for projecting light emitted from said light emitting means toward an object to be detected;

light receiving means for receiving the light reflected from said object; and a light receiving optical system for collecting said reflected light on said light receiving means, so that a position of said object is detected in accordance with a position of said reflected light incident on said light receiving means, wherein said light emitting means includes a plurality of light emitting elements and a light emitting optical system disposed in front of said plurality of light emitting elements, having an exit surface from which light emitted from said plurality of light emitting elements emerges, with a positive refracting power as a whole wherein the exit surface of said light emitting optical system is constructed from a plurality of curved surfaces, with said curved surfaces being combined in pairs with said light emitting elements, and wherein a refracting power $\Sigma$ of the exit surface of the light emitting optical system satisfies the following conditions:

$\Sigma = r/((1-n)d + nr) > 1.0$ $g \geq \phi_1$ wherein r is the radius of curvature of the exit surface of the light emitting optical system, d the distance along an optical axis from each light emitting element to the vertex of the exit surface, n the refractive index of the light emitting optical system, g the distance from the optical axis to each light emitting element, and $\phi_1$ is the maximum value of an optical effective aperture of the exit surface.

* * * * *